No. 657,353. Patented Sept. 4, 1900.
H. C. MOSHIER.
BALING PRESS.
(Application filed Feb. 1, 1900.)
(No Model.) 2 Sheets—Sheet 1.
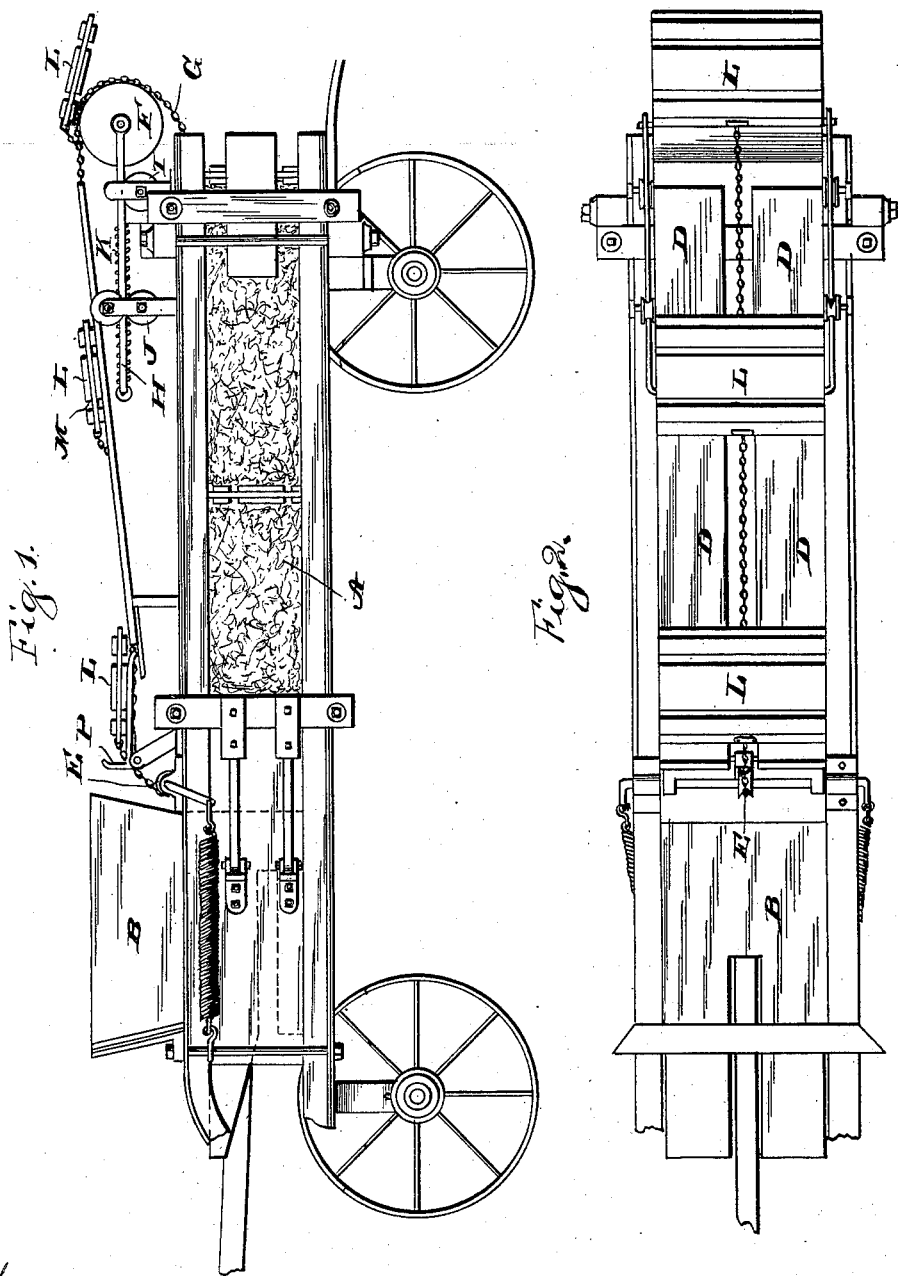

No. 657,353. Patented Sept. 4, 1900.
H. C. MOSHIER.
BALING PRESS.
(Application filed Feb. 1, 1900.)
(No Model.) 2 Sheets—Sheet 2.
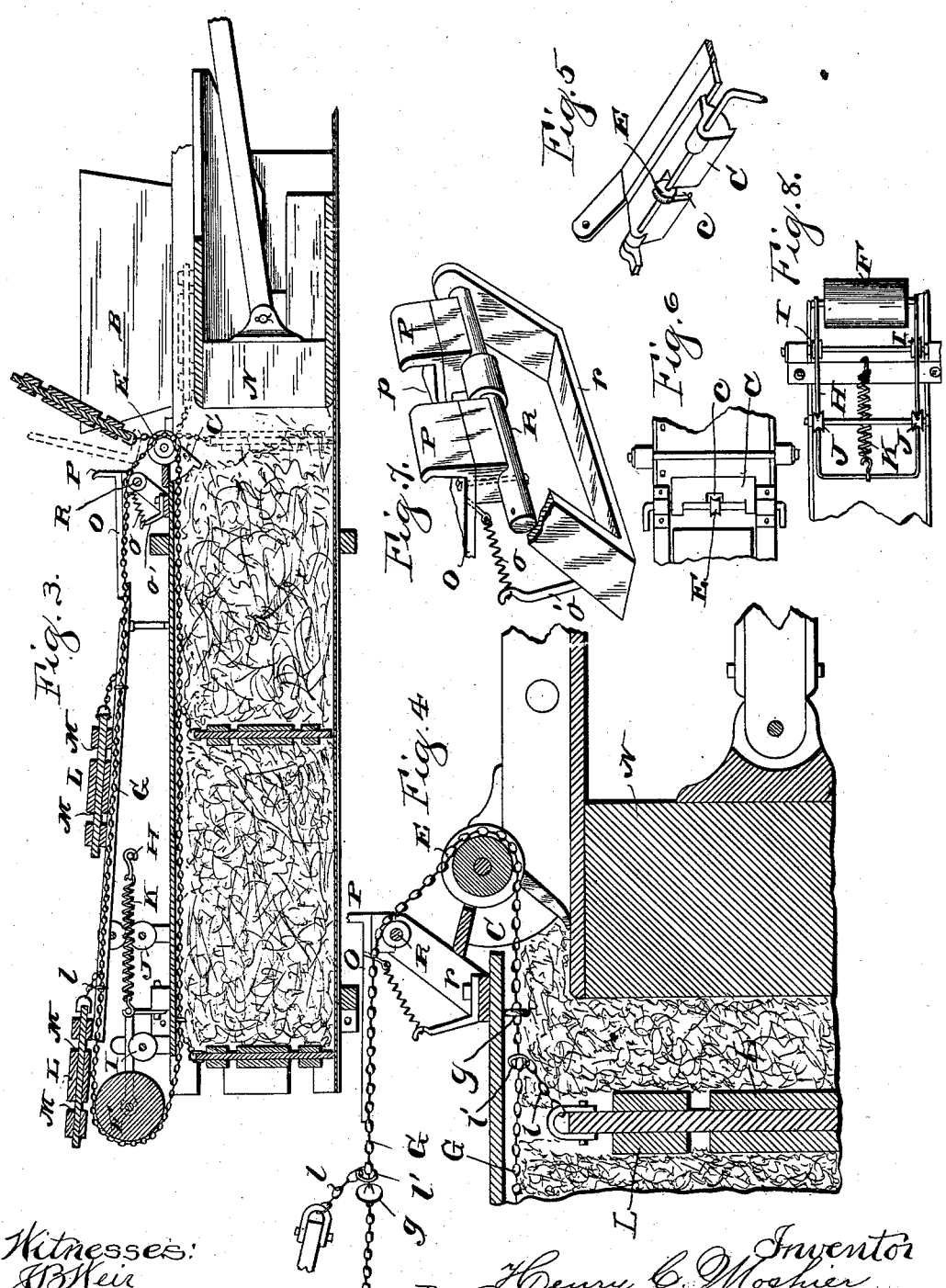

UNITED STATES PATENT OFFICE.

HENRY CLAY MOSHIER, OF GALESBURG, ILLINOIS.

BALING-PRESS.

SPECIFICATION forming part of Letters Patent No. 657,353, dated September 4, 1900.

Application filed February 1, 1900. Serial No. 3,630. (No model.)

*To all whom it may concern:*

Be it known that I, HENRY CLAY MOSHIER, a citizen of the United States, residing at Galesburg, in the county of Knox and State of Illinois, have invented certain new and useful Improvements in Baling-Presses, of which the following is a specification.

This invention relates to improvements in baling-presses, and more particularly to that general class designed for baling hay, in which the division-boards between which the bales are formed are automatically inserted at proper intervals and forced through the press-box by the compressing action of the plunger. These division or parting boards have generally been separate detached boards which are inserted by hand through the feed-opening of the press, either at such intervals as the operator may determine or upon signal, and obviously such a method of handling the boards necessarily conduces to great irregularity in the sizes of the bales and besides imposes considerable additional and unnecessary manual labor upon the operator whose duty it is to tie bales. So far as I am aware no baling-press has heretofore been provided with parting-boards which are instantly arranged in position in the press-box at the proper time and without interferring in any way with the operation of the plunger, this operation being accomplished automatically during a single operation of the plunger.

One primary object of my invention is to avoid the objections just noted and at the same time insure uniformity in size of the bales and avoidance of the necessity for reliance upon signal or the judgment of the operator for determining when a bale is completed.

Another object of my invention is to have the sizing of the bales entirely automatic by placing the division or parting boards in unvarying succession in the press-box to divide the material being operated upon into bales of a desired and uniform size.

Another primary object of my invention is to provide an automatic flopping device for quickly throwing the parting-boards onto the top of the plunger when in its forward position, from whence they will drop into position wholly within the press-box when the plunger moves back to its rearward position and without interfering in any way with the operation of the plunger.

Further objects of my invention are to provide for maintaining a uniform tension on the carrier, for connecting the parting-boards with the carrier in a novel manner, for constructing the flopper peculiarly to permit its flopping action without interfering with the carrier, and for constructing the folder in an improved manner.

My invention also has other objects in view which will be fully pointed out hereinafter in the detail description in connection with the accompanying drawings, in which—

Figure 1 represents a side elevation of a baling-press embodying my invention. Fig. 2 is a top plan view thereof. Fig. 3 is a vertical longitudinal sectional view of the baling-press. Fig. 4 is an enlarged detailed vertical sectional view showing the mouth of the press-box. Fig. 5 is a detail view of the folder. Fig. 6 is a bottom plan view showing folder. Fig. 7 is a perspective view of the flopper device. Fig. 8 is a view showing the floating-frame in which the roller F is mounted.

Referring to the drawings, in which like letters of reference denote similar parts in all the figures, A designates the press-box of the machine, which is of the usual tapering form, being slightly contracted from the receiving to the delivering end thereof for the purpose of giving the necessary compression, and this box may be of any form or construction and provided with the usual feed-hopper B or an opening in lieu thereof at the forward end and with a spring-actuated folder C at the rear edge of said opening, all of which features are common in machines of this class and broadly speaking form no part of my present invention. A platform D is arranged above the box, or in lieu of the platform simple guide-bars or guides of any kind may be provided. The platform is preferably disposed at a slight angle to the top of the box, and at each end of the box are arranged, respectively, the rollers E and F, around which are trained an endless belt or carrier G, which in the drawings is shown in the form of a chain. The roller E at the forward end of the box is preferably mounted upon a nonmovable shaft, while the roller F at the rear end of the box is mounted in a movable frame H, Fig. 8, which is generally rectangular in shape, its sides working over and under the rollers I and J. A coil-spring K is secured to the frame H and to a rigid portion of the frame of the machine, so that the retractile force of the spring tends to project the frame, and consequently the roller F, rearwardly, thus operating to take up slack in the carrier, which may be occasioned by wear or expansion, and also to provide for the shortening of the chain, caused by the operation of the plunger in compressing the bales, and also by the action of the flopping device, it being noted that the carrier will tend to pass into the press-box more rapidly than it passes therefrom.

The division or parting boards L are attached loosely to the carrier in a novel manner; but in their general form, such as in the grooves M, to receive the tie-wires for the bales while under compression, these boards are substantially similar to those now commonly employed in machines of this class. The carrier, and consequently these boards, which latter return along the platform or guides D after leaving the press-box, is fed through the press-box by the action of the plunger in compressing the material in the box in the formation of the bale, and as the parting-boards are connected to the carrier at regular intervals it is obvious that they will determine the length of the bales, because as each board is forced through the press-box the next succeeding board must be drawn down and into the box in regular order.

Ordinarily the parting-boards may be fastened to the carrier by means of a short chain l, the end of this chain being connected to a link of the carrier-chain; but I have found it more desirable to provide the chain l with a ring l' on its end to receive the carrier-chain G, Fig. 4. In order to move the parting-boards around with the carrier, I provide buttons g or knots or any other similar devices at regular intervals on the carrier, which are large enough to avoid passing through the rings l' and which engage said rings and move them, together with the parting-boards, over and through the press-box. If the parting-boards were rigidly connected at the top to the carrier, the lower part thereof would be apt to spring out of the press-box after the bale is tied and about to be discharged, its upper portion still bearing upon the bale and affording sufficient compression thereof to permit the bale to expand at the lower part while the upper part is compressed, and the natural result would be that the hay in the upper part of the bale would crowd down into the expanding lower part and permit the upper tie-wire to slip off. By providing this loose connection for the parting-board with the carrier the board will slip out of the press-box without binding or compressing the upper portion of the bale more than the lower portion thereof, as frequently results in the presses of the prior art, and therefore the liability of the upper tie-wire slipping is avoided. In order to facilitate the movement of the boards and the carrier, I provide the folder C, Fig. 5, with a slot c and make the roller E in the form of a pulley, as shown. The slot is provided to accommodate the carrier which passes therethrough and around the pulley E, thereby avoiding the engagement of the carrier with the edges of the folder.

The endless carrier and the parting or division boards attached thereto, adapted to be arranged wholly within the press-box at one operation and without interfering with the plunger, constitute the essential and broad feature of my invention, and while I prefer to provide an automatic device for assisting the boards to flop over at the forward end of the carrier into the press-box, it is obvious that this operation will be accomplished to a certain degree of perfection without the addition of any automatic device. In the practical use of the machine I have found that satisfactory results can be attained by having the operator who is feeding the hay or other material into the hopper use his pitchfork to flop the parting-boards over onto the top of the plunger N or directly in position in the feed-box at the proper time, this operation being well understood by those accustomed to using machines of this class. Of course, subject to considerable strain on the carrier, the boards would be ultimately flopped over in the movement of the carrier without the use of an automatic flopping device; but it is desirable to avoid this strain, and to this end I have provided means for automatically accomplishing this action with practically no strain whatever upon the carrier or upon the machine. These means consist of a tilting frame or platform O, constituting in effect a continuation of the platform or guide D at the forward end thereof, which tilting platform is provided with an upwardly-projecting end P and is suitably mounted on the shaft R, which is supported in the bracket r on the press-box. This platform is normally maintained in its horizontal position by means of a spring o, which is connected to the platform and to an arm o' on the press-box, and the platform and its upward projection are slotted, as at p, to accommodate the carrier. The construction of this automatic flopping device is such that as the parting-board moves over the platform D and onto the tilting frame or platform O, the latter being of sufficient length to extend beyond the middle of the board, the forward edge of the board will strike the projection P, and as the feed continues the frame or platform N will be turned upon its pivot, carrying the rear or free edge of the board up and over until the board passes the center of gravity, when it will fall upon the top of the plunger, as illustrated in dotted lines in Fig. 3. When the plunger is retracted from its forward position, as shown in Fig. 3, the parting-board resting thereon will drop into operative position in the feed-box. It will thus be observed that I provide automatic devices for flopping the parting-boards into operative position in the feed-box during one complete operation of the plunger and in such a manner that it will not in any way interfere with the movement of the plunger. If the board were introduced gradually, it might be struck and broken by the plunger, and if no automatic means were provided for moving the board the plunger would have to be stopped to permit of the board being placed in position or else the board would have to be inserted by hand. By the use of my improved flopping device it will be observed that I absolutely avoid all unusual and unnecessary strain upon the carrier, and at the same time I provide a device operating automatically under the pull exerted by the ordinary movement of the carrier to carry the parting-board up bodily and flop it into position in the press-box during one operation of the plunger.

A baling-press embodying my invention is simple in construction, while most effective in operation, as well as insuring results not possible either by the ordinary method of placing the parting-boards in the press-box by hand or by any method of automatic feeding of the parting-boards known to me. Besides, my invention adds little to the cost and weight of the machine as a whole and greatly increases the capacity of the machine by reason of the regularity and certainty with which the operations are performed.

Obviously many changes in the construction and arrangement of the parts of the machine may be made without departing from the spirit of my invention, and all such changes fall within the purview of my invention. For instance, I have shown and described the endless carrier as consisting of a single belt or chain, whereas two or more such chains may obviously be employed, to one or more of which the parting-boards will be attached and the platform or guides may be dispensed with. Furthermore, while I have shown the parting-boards attached at their centers of length to the carrier and by a short chain, obviously they may be attached at other points where multiple belts or chains constitute the carrier, and they may be attached in any suitable manner other than that herein described.

Having thus fully described my invention, what I claim, and desire to secure by Letters Patent, is—

1. In a baling-press, the combination with a press-box, of an endless carrier threaded through said box, and a series of parting-boards attached to said carrier and means for moving said parting-boards into position for operation in the press-box at one operation of the plunger, substantially as described.

2. In a baling-press, the combination with a press-box, of an endless carrier threaded through said box, and a series of parting-boards loosely connected at one edge to said carrier and means for moving said parting-boards into operative position in the press-box in one operation of the plunger, substantially as described.

3. In a baling-press, the combination with a press-box and a platform or guide above the same, of an endless carrier arranged to travel through said box and over said platform or guides, and a series of parting-boards attached at one edge to said carrier and means for moving said parting-boards into operative position in the press-box in one operation of the plunger, substantially as described.

4. In a baling-press, the combination with a press-box and an endless carrier arranged to travel through said box, of a series of parting-boards attached to said carrier, and means for automatically flopping said boards just prior to entering the press-box, substantially as described.

5. In a baling-press, the combination with a press-box and a platform or guide above said box, of an endless carrier arranged to travel over said platform or guide and through the box, a series of parting-boards attached to said carrier, and means for automatically flopping said boards prior to entering the press-box, substantially as described.

6. The combination with a press-box and an endless carrier arranged to travel through said box, of a series of parting-boards attached to said carrier, a pivoted tilting platform near the forward end of said carrier, and a projection on said platform adapted and arranged to engage the forward edge of said parting-boards, whereby the latter will be flopped over, substantially as described.

7. The combination with a press-box and an endless carrier arranged to travel through said box, of a series of parting-boards attached to said carrier, a pivoted tilting platform near the forward end of said carrier, an angular projection on said platform arranged in the path of movement of the parting-boards and adapted to flop said parting-board when the latter engage said projection, and means for returning the platform to its regular position after it has discharged the parting-board, substantially as described.

8. The combination with a press-box and an endless carrier, arranged to travel through said box, of parting-boards attached to said carrier, a pivoted tilting platform near the forward end of said carrier, and provided with a slot to receive the carrier, said platform being adapted to be engaged by the parting-board and tilted to flop over and discharge the parting-board, substantially as described.

9. The combination with an endless carrier, of parting-boards and chains fastened to the parting-boards and carrying rings on their free ends to receive the endless carrier whereby the parting-boards are loosely connected to the carrier, substantially as described.

10. The combination with an endless carrier provided with buttons at suitable intervals, of parting-boards and chains connected to said parting-boards at one end and provided with rings on their other ends to receive the carrier and be engaged by the buttons thereon, substantially as described.

11. The combination with a press-box, an endless carrier, arranged to travel therethrough, and a series of parting-boards attached to said carrier, of a folder at one end of said press-box and provided with a slot and a pulley to receive the carrier, substantially as described.

12. The combination with a press-box, an endless carrier arranged to travel therethrough, and a series of parting-boards attached to said carrier, of a movable frame carrying a roller at one end of the press-box and adapted to maintain the carrier at an even tension, substantially as described.

13. The combination with a press-box, an endless carrier arranged to travel therethrough, and a series of parting-boards attached to said carrier, of a movable frame located at one end of said box and carrying a roller over which the carrier operates and which is adapted to maintain the carrier at an even tension, and a folder at the opposite end of said press-box provided with a slot and a pulley to receive the carrier, substantially as described.

HENRY CLAY MOSHIER.

Witnesses:
N. T. ALLEN,
W. H. SEIBERT.